United States Patent
Song et al.

(10) Patent No.: US 8,832,586 B2
(45) Date of Patent: Sep. 9, 2014

(54) MOBILE TERMINAL AND METHOD FOR CONTROLLING OPERATION OF THE SAME

(75) Inventors: Yoo Mee Song, Seoul (KR); Byung Sang Yeo, Seoul (KR); Seong Yoon Cho, Seoul (KR); Yee Rang Yun, Seoul (KR); Hye Youn Cho, Seoul (KR); Dong Seok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 12/876,989

(22) Filed: Sep. 7, 2010

(65) Prior Publication Data

US 2011/0061016 A1    Mar. 10, 2011

(30) Foreign Application Priority Data

Sep. 7, 2009    (KR) .................... 10-2009-0084178

(51) Int. Cl.
| | | |
|---|---|---|
| G06F 3/048 | (2013.01) | |
| G06F 3/14 | (2006.01) | |
| H04L 29/08 | (2006.01) | |
| H04L 29/06 | (2006.01) | |
| H04W 4/00 | (2009.01) | |
| H04W 4/02 | (2009.01) | |
| H04M 1/725 | (2006.01) | |

(52) U.S. Cl.
CPC .............. *H04L 37/24* (2013.01); *H04W 4/023* (2013.01); *H04W 4/021* (2013.01); *H04M 2250/12* (2013.01); *H04M 1/72561* (2013.01); *H04W 4/02* (2013.01); *H04L 67/18* (2013.01); *H04M 1/72572* (2013.01); *H04L 63/107* (2013.01); *H04W 4/001* (2013.01)
USPC .......................................... 715/779; 715/864

(58) Field of Classification Search
CPC ... G06F 3/0481; G06F 3/0482; G06F 9/4443; G06F 1/1626; G06F 21/31; G06F 3/04886; G06F 8/38
USPC ................................... 715/864, 741, 779, 762
See application file for complete search history.

(56) References Cited

U.S. PATENT DOCUMENTS

| | | | | |
|---|---|---|---|---|
| 6,662,366 | B1* | 12/2003 | Hama et al. ..................... | 725/39 |
| 6,865,680 | B1* | 3/2005 | Wu et al. .......................... | 726/12 |
| 7,380,007 | B1* | 5/2008 | Bu et al. ......................... | 709/227 |
| 7,650,571 | B2* | 1/2010 | Sinai .............................. | 715/738 |
| 2004/0168092 | A1* | 8/2004 | Adachi .......................... | 713/202 |
| 2006/0107217 | A1* | 5/2006 | Lu et al. ........................ | 715/733 |
| 2007/0030824 | A1* | 2/2007 | Ribaudo et al. ............... | 370/328 |

(Continued)

FOREIGN PATENT DOCUMENTS

| | | |
|---|---|---|
| CN | 101491126 A | 7/2009 |
| KR | 711726 * | 4/2007 |
| WO | WO 03/079578 A1 | 9/2003 |

*Primary Examiner* — Rashawn Tillery
(74) *Attorney, Agent, or Firm* — Birch, Stewart, Kolasch & Birch, LLP

(57) ABSTRACT

A mobile terminal including a wireless communication unit configured to transmit and receive signals to and from a network or Internet site; and a controller operatively connected to the wireless communication unit and configured to set an automatic login region or time period within the mobile terminal for automatically logging into the network or Internet site, to determine whether or not the mobile terminal has entered or exited the automatic login region or time period and generate a corresponding determination result, and to automatically log into the network or Internet site if the determination result indicates that the mobile terminal has entered the automatic login region or time period.

14 Claims, 15 Drawing Sheets

(56) References Cited

U.S. PATENT DOCUMENTS

| | | | |
|---|---|---|---|
| 2007/0032225 A1* | 2/2007 | Konicek et al. | 455/417 |
| 2007/0060108 A1 | 3/2007 | East et al. | |
| 2008/0019317 A1* | 1/2008 | Vellanki et al. | 370/331 |
| 2008/0089295 A1 | 4/2008 | Keeler et al. | |

* cited by examiner (a)

(b)

(c)

(d)

(a)

(b)

(c)

(d)

(a)

(b)

(c)

(c)

(a)

(b)

(c)

(d)

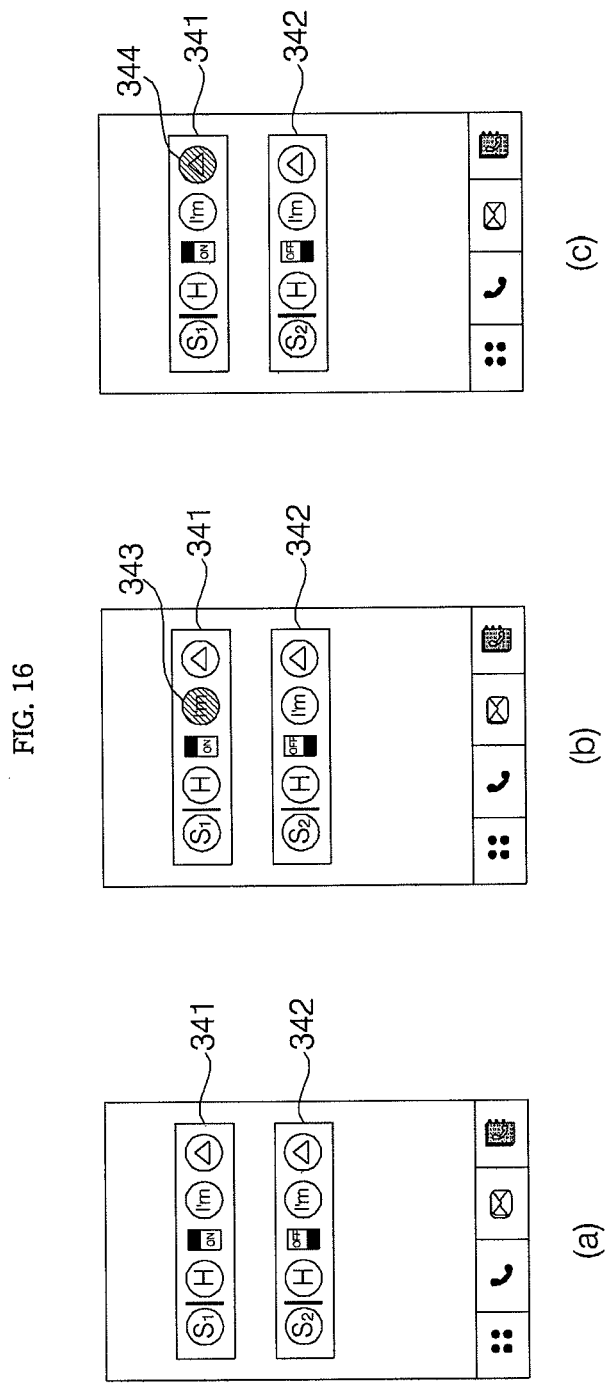

MOBILE TERMINAL AND METHOD FOR CONTROLLING OPERATION OF THE SAME

CROSS-REFERENCE TO A RELATED APPLICATION

This application claims the benefit of priority to Korean Application No. 10-2009-0084178, filed Sep. 7, 2009 in the Korean Intellectual Property Office, the disclosure of which is incorporated herein by reference.

BACKGROUND OF THE INVENTION

1. Field of the Invention

The present invention relates to a mobile terminal and corresponding method for automatically logging in to a desired network or Internet site when entering a predetermined region or time period.

2. Description of the Related Art

A mobile terminal provides many additional functions besides voice and video communication. For example, mobile terminals can now capture still or moving images (i.e., photographs or videos), reproduce music or video files, play games, receive broadcasts, and provide an wireless Internet function. Thus, the mobile terminal function as an all-in-one multimedia player.

Various novel attempts have been made in terms of hardware or software to achieve more complicated functions of the mobile terminal implemented as a multimedia player. One example is provision of a user interface environment allowing the user to easily and conveniently find and select a desired function. As the mobile terminal is now considered a personal belonging expressing the user's personality, there has been demand for various interface designs such as a double-sided Liquid Crystal Display (LCD), which can be viewed from both sides of the mobile terminal, or a touch screen.

However, allocation of space for a user interface such as a keypad or a display is restricted because the mobile terminal is designed taking into consideration mobility or portability. To efficiently use various functions provided by the mobile terminal, there is a need to control the operation of the mobile terminal using a new input/output scheme instead of a conventional scheme in which menu items in a complicated structure are sequentially selected.

SUMMARY OF THE INVENTION

Therefore, the present invention has been made in view of the above problems, and it is an object of the present invention to provide a mobile terminal and a method for controlling the operation of the same wherein it is possible to set a region or time period for automatically logging in to a network or Internet site.

It is another object of the present invention to provide a mobile terminal and a method for controlling the operation of the same wherein the mobile terminal can update user information of a network or Internet site which the mobile terminal has automatically logged in to or can upload content to the network or Internet site.

In accordance with an aspect of the present invention, the above and other objects can be accomplished by the provision of a method for controlling an operation of a mobile terminal, the method including setting an automatic login region or time period for automatically logging in to a network or Internet site, determining whether or not the mobile terminal has entered the automatic login region or time period, and automatically logging in to the network or Internet site when the mobile terminal has entered the automatic login region or time period.

In accordance with another aspect of the present invention, there is provided a method for controlling an operation of a mobile terminal, the method including displaying a toolbar or widget including an icon or menu corresponding to a network or Internet site or a toolbar or widget indicating information associated with the network or Internet site, and changing a display state of the toolbar or widget according to whether or not the mobile terminal has logged in to the network or Internet site.

In accordance with another aspect of the present invention, there is provided a mobile terminal including a wireless communication unit for transmitting and receiving signals to and from a network or Internet site, a display unit for displaying a screen associated with the network or Internet site, and a controller for setting an automatic login region or time period for automatically logging in to the network or Internet site, determining whether or not the mobile terminal has entered the automatic login region or time period, and controlling the wireless communication unit to automatically log in to the network or Internet site when the mobile terminal has entered the automatic login region or time period.

In accordance with another aspect of the present invention, there is provided a mobile terminal including a display unit, a wireless communication unit for transmitting and receiving signals to and from a network or Internet site, a display unit for displaying a screen associated with the network or Internet site, and a controller for displaying a toolbar or widget including an icon or menu corresponding to a network or Internet site or a toolbar or widget indicating information associated with the network or Internet site on the display unit and changing a display state of the toolbar or widget according to whether or not the mobile terminal has logged in to the network or Internet site.

In accordance with another aspect of the present invention, there is provided a computer readable recording medium storing a program causing a processor to perform the above method.

BRIEF DESCRIPTION OF THE DRAWINGS

The above and other objects, features and other advantages of the present invention will be more clearly understood from the following detailed description taken in conjunction with the accompanying drawings, in which:

FIGS. 7 to 16 illustrate screenshots of a mobile terminal used to explain a method for controlling the operation of the mobile terminal according to embodiments of the present invention.

DETAILED DESCRIPTION OF THE INVENTION

The present invention will now be described in more detail with reference to the drawings.

A mobile terminal as described in this specification may include a mobile phone, a smart phone, a laptop, a digital broadcast terminal, a Personal Digital Assistant (PDA), a Portable Multimedia Player (PMP), a navigation device, or another type of mobile terminal.

Figure 1:
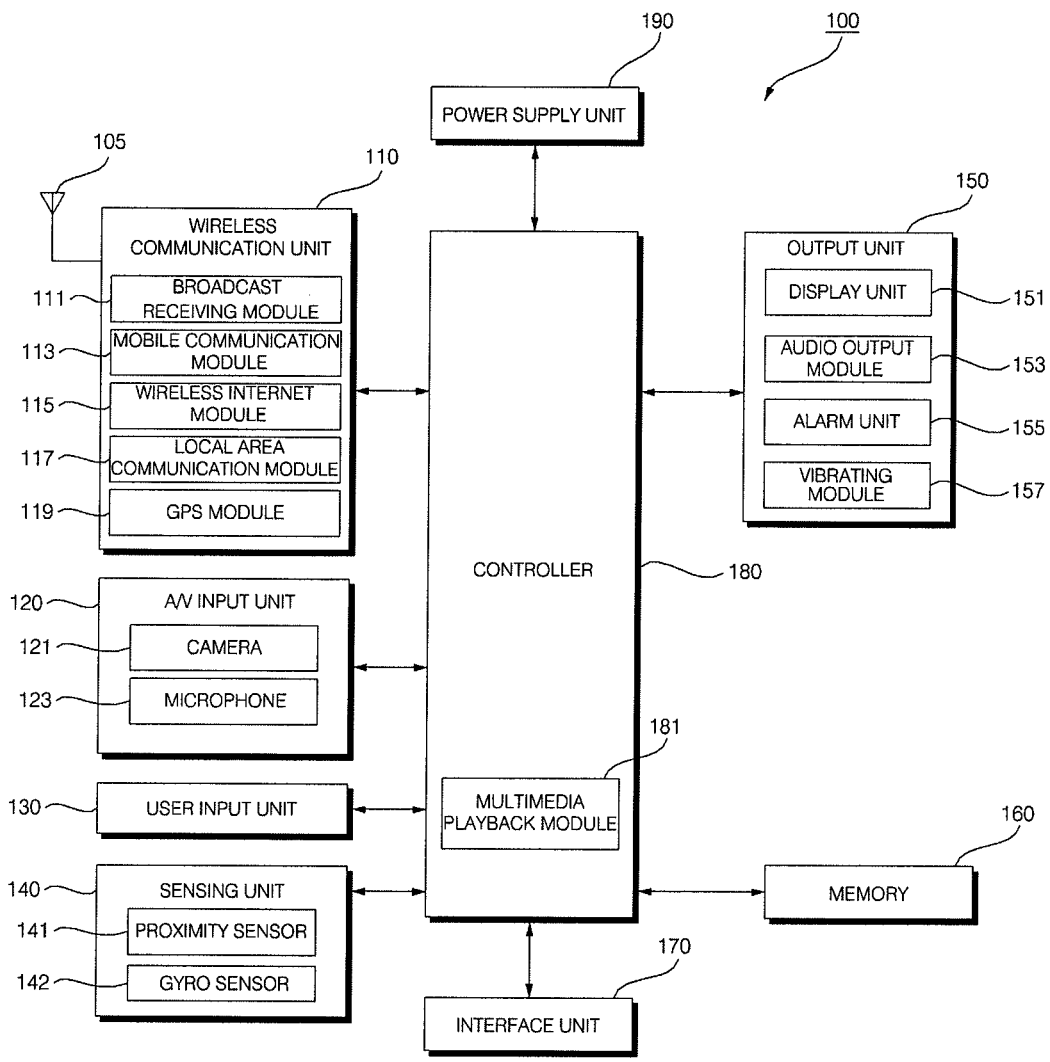
FIG. 1 is a block diagram of a mobile terminal according to an embodiment of the present invention.

FIG. 1 is a block diagram of a mobile terminal according to an embodiment of the present invention. As shown in FIG. 1, the mobile terminal 100 includes a wireless communication unit 110, an Audio/Video (AV) input unit 120, a user input unit 130, a sensing unit 140, an output unit 150, a memory 160, an interface unit 170, a controller 180, and a power supply unit 190. In actual applications, two or more of these components may be combined into one component or one component may be divided into two or more components as needed. For example, the A/V input unit 120 or the sensing unit 140 may be incorporated into the user input unit 130.

In FIG. 1, the wireless communication unit 110 includes a broadcast receiving module 111, a mobile communication module 113, a wireless Internet module 115, a local area communication module 117, and a Global Positioning System (GPS) module 119. The broadcast receiving module 111 receives at least one of a broadcast signal and broadcast-related information from an external broadcast management server through a broadcast channel. Further, the broadcast channel may include a satellite channel, a terrestrial channel, or the like. The broadcast management server may be a server that generates and transmits at least one of a broadcast signal and broadcast-related information or a server that receives and transmits at least one of a broadcast signal and broadcast-related information, which have been previously generated, to a terminal.

In addition, the broadcast-related information corresponds to information relating to a broadcast channel, a broadcast program, or a broadcast service provider. The broadcast signal may not only include a TV broadcast signal, a radio broadcast signal, or a data broadcast signal but may also include a broadcast signal generated by incorporating a data broadcast signal into a TV or radio broadcast signal. The broadcast-related information may also be provided through a mobile communication network. In this instance, the broadcast-related information may be received by the mobile communication module 113. The broadcast-related information may be provided in various forms. For example, the broadcast-related information may be provided in the form of a Digital Multimedia Broadcasting (DMB) Electronic Program Guide (EPG) or a Digital Video Broadcast-Handheld (DVB-H) Electronic Service Guide (ESG).

The broadcast receiving module 111 receives a broadcast signal using a variety of broadcast systems. Specifically, the broadcast receiving module 111 can receive a digital broadcast signal using a digital broadcast system such as a Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T) system. The broadcast receiving module 111 may also be configured to be suitable not only for such a digital broadcast system but also for any other broadcast system that provides a broadcast signal. A broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

Further, the wireless Internet module 115 is an internal or external module for wireless Internet access provided to the mobile terminal 100, and the local area communication module 117 is a module for local area communication. Bluetooth, Radio Frequency Identification (RFID), Infrared Data Association (IrDA,), Ultra Wideband (UWB), or ZigBee may be used as a local area communication technology. The GPS module 119 receives location information from multiple GPS satellites.

In addition, the A/V input unit 120 is provided to input an audio or video signal and in FIG. 1 includes a camera 121 and a microphone 123. The camera 121 processes an image frame such as a still image (or photograph) or a moving image (or video) obtained through an image sensor in a video communication mode or an image capture mode, and the processed picture frame can be displayed on the display unit 151. The picture frame processed at the camera 121 may be stored in the memory 160 or may be transmitted to the outside through the wireless communication unit 110. Two more cameras 121 may also be provided depending on the configuration of the mobile terminal.

Further, the microphone 123 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 113. A variety of noise removal algorithms may also be used to remove noise generated in the course of receiving an external audio signal through the microphone 123.

The user input unit 130 generates key input data corresponding to a key input operation that a user has performed to control the operation of the terminal. The user input unit 130 may include a key pad, a dome switch, a (e.g., resistive/capacitive) touchpad, a jog wheel, a jog switch, a finger mouse, or the like. When the touchpad forms a multilayer structure with the display unit 151 that is described later, the touchpad can be referred to as a "touch screen".

In addition, the sensing unit 140 can detect a current state of the mobile terminal 100 such as whether the mobile terminal 100 is opened or closed, the position of the mobile terminal 100, or whether or not the user is in contact with the mobile terminal 100 and generates a sensing signal for controlling the operation of the mobile terminal 100. The sensing unit 140 can also sense whether the mobile terminal 100 is opened or closed when the mobile terminal 100 is a slide phone. The sensing unit 140 may also be responsible for sensing functions associated with whether or not the power supply unit 190 is supplying power or whether or not the interface unit 170 is coupled to an external device.

Further, in FIG. 1, the sensing unit 140 includes a proximity sensor 141 that can detect a presence or absence of an object that is approaching or near to the sensing unit 140 without mechanical contact. The proximity sensor 141 can also detect a close object using change of AC magnetic fields or change of magnetostatic fields or using the rate of change of capacitance. Two or more proximity sensors 141 may also be provided depending on the configuration of the mobile terminal.

Further, in FIG. 1, the sensing unit 140 includes a gyro sensor 142. The gyro sensor 142 may include an inertial sensor, an acceleration sensor, or any sensor which detects movement of an object using a gyroscope. The gyroscope may be classified into a mechanical gyroscope, a ring laser gyroscope, and a fiber optic gyroscope. The gyro sensor 142 detects movement of the mobile terminal and provides a signal for controlling the mobile terminal.

The output unit 150 is also provided to output an audio or video signal or an alarm signal and includes a display unit 151, an audio output module 153, an alarm unit 155, and a vibrating module 157. In addition, the display unit 151 displays information processed in the mobile terminal 100. For example, when the mobile terminal 100 is in a voice or video communication mode, the display unit 151 displays a communication-related User Interface (UI) or Graphical User Interface (GUI). When the mobile terminal 100 is in a video communication mode or an image capture mode, the display unit 151 may individually or simultaneously display captured or received images and may display a corresponding UI or GUI.

Also, when the display unit 151 forms a multilayer structure with the touchpad to construct a touch screen as described above, the display unit 151 may not only be used as an output device but may also be used as an input device. When the display unit 151 includes a touch screen, the display unit 151 includes a touch screen panel, a touch screen panel controller, or the like. That is, the touch screen panel is a transparent panel externally attached to the mobile terminal 100 and may be connected to an internal bus of the mobile terminal 100. The touch screen panel monitors touches and sends, upon detecting a touch input, corresponding signals to the touch screen panel controller. The touch screen panel controller processes the signals and transmits the resulting data to the controller 180 and the controller 180 then determines whether or not a touch input has occurred and which region of the touch screen has been touched.

In addition, the display unit 151 may include at least one of a liquid crystal display, a thin film transistor-liquid crystal display, an organic light-emitting diode, a flexible display, a transparent display, and a 3D display. Two or more display units 151 may be provided depending on the implementation of the mobile terminal 100. For example, both an external display unit (not shown) and an internal display unit (not shown) may be provided to the mobile terminal 100.

Further, the audio output module 153 outputs audio data received from the wireless communication unit 110 or stored in the memory 160 when the mobile terminal 100 is in an incoming call receiving mode (i.e., a ringing mode), a voice or video communication mode, a record mode, a voice recognition mode, or a broadcast receiving mode. The audio output module 153 outputs audio signals associated with functions performed by the mobile terminal 100, for example, an audio signal associated with an incoming call sound (e.g., a ringtone) or a message receipt sound. The audio output module 153 may include a speaker, a buzzer, or the like.

The alarm unit 155 can also output a signal notifying the user that an event has occurred in the mobile terminal 100. Examples of the event occurring in the mobile terminal 100 include an incoming call reception, message reception, and key signal input. The alarm unit 155 outputs a signal notifying the user of the occurrence of an event in a different form from the audio or video signal. For example, the alarm unit 155 may output the notification signal through vibration. When an incoming call signal is received or when a message is received, the alarm unit 155 can output a signal indicating the reception of the incoming call signal or the message. When a key signal is input, the alarm unit 155 can output a signal as a feedback to the key signal input. The user can then perceive the event occurrence through the signal output from the alarm unit 155. The signal indicating the event occurrence may also be output through the display unit 151 or the audio output module 153.

Further, the vibrating module 157 can generate a vibration having varying degrees of intensity and patterns according to a vibration control signal transmitted by the controller 180. The strength, pattern, frequency, moving direction, moving speed, and the like of the vibration generated by the vibrating module 157 may be set by the vibration control signal. Two or more vibration modules 157 may also be provided depending on the mode of implementation of the mobile terminal 100.

In addition, the memory 160 may store a program for processing and control by the controller 180 and may function to temporarily store input or output data items (for example, a phonebook, messages, still images, and moving images). The memory 160 may include a storage medium of at least one of a variety of types including a flash memory type, a hard disk type, a multimedia card micro type, a card memory type (for example, SD or XD memory), RAM, and ROM. The mobile terminal 100 may utilize cloud storage that performs a storage function of the memory 160 over the Internet.

Further, the interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as an SIM/UIM card socket, an audio Input/Output (I/O) terminal, a video I/O terminal, and an earphone. The interface unit 170 can receive power or data from such an external device and provide the same to each internal component of the mobile terminal 100 and can also transmit internal data of the mobile terminal 100 to the external device.

The controller 180 generally controls the operation of each component to control the overall operation of the mobile terminal 100. For example, the controller 180 performs control and processing associated with voice communication, data communication, video communication, and the like. In FIG. 1, the controller 180 includes a multimedia playback module 181 for multimedia reproduction. The multimedia playback module 181 may be implemented by hardware in the controller 180 or may be implemented by software separately from the controller 180. Under control of the controller 180, the power supply unit 190 receives external power or internal power and supplies power required for operation to each component.

Further, the mobile terminal according to an embodiment of the present invention has been described above from the viewpoint of functional components thereof. In the following description, the mobile terminal according to an embodiment of the present invention is described in detail with reference to FIGS. 2 and 3, from the viewpoint of components viewed on the external surface thereof. For ease of explanation, the following description will be given with reference to a bar type mobile terminal having a front touch screen as an example among various types of mobile terminals such as folder, bar, swing, and slider types. However, the present invention is not limited to the bar type mobile terminal and can be applied to any type of mobile terminal including the types described above.

Figure 2:
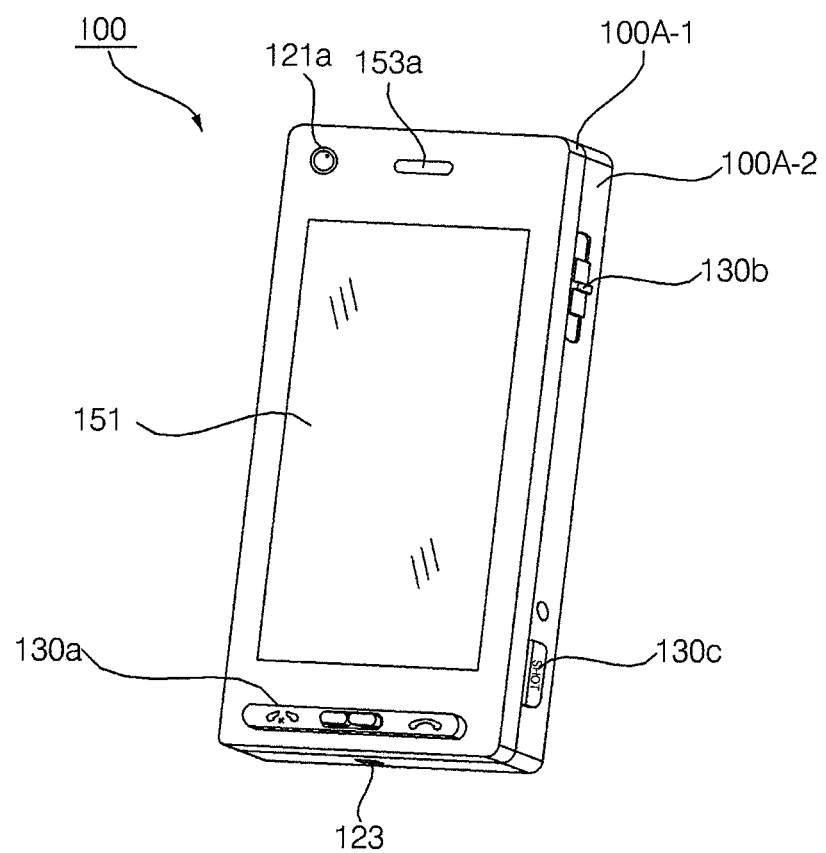
FIG. 2 is a front perspective view of a mobile terminal according to an embodiment of the present invention.

FIG. 2 is a front perspective view of a mobile terminal according to an embodiment of the present invention. As shown in FIG. 2, a case defining the external appearance of the mobile terminal 100 includes a front case 100A-1 and a rear case 100A-2. A variety of electronic parts are provided in a space defined within the front and rear cases 100A-1 and 100A-2. At least one intermediate case may be additionally provided between the front case 100A-1 and the rear case 100A-2. These cases may be formed through synthetic resin injection molding may be formed of a metal material such as stainless steel (STS) or titanium (Ti).

The display unit 151, a first audio output module 153a, a first camera 121a, and a first user input unit 130a are arranged in a main body of the mobile terminal 100, specifically, in the front case 100A-1. A second user input unit 130b, a third user input unit 130c, and the microphone 123 are arranged on a side surface of the rear case 100A-2. Further, the display unit 151 includes a Liquid Crystal Display (LCD), Organic Light Emitting Diodes (OLED), or the like to visually express information. A touchpad may be formed in a layered structure overlapping the display unit 151 such that the display unit 151 operates as a touch screen allowing the user to input information through touching.

The first audio output module 153a may be implemented in a receiver or speaker form, and the first camera 121a may be implemented to be suitable for capturing a still or moving image of the user or the like. Further, the microphone 123 may be implemented in a form suitable for receiving sound such as user voice. Also, the first to third user input units 130a, 130b, and 130c may be collectively referred to as the user input unit 130. The user input unit 130 may be of any type including the user input unit 130 operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick. In terms of functionality, the first user input unit 130a allows the user to input a command such as start, end, or send and the second user input unit 130b allows the user to select an operating mode of the mobile terminal 100. The third user input unit 130c may function as a hot key for activating a special function of the mobile terminal 100.

When a finger of the user comes close to the display unit 151, the proximity sensor 141 mounted on a first body detects the finger and outputs a close signal. Here, the proximity sensor 141 may be configured to output a different close signal according to the distance of the finger of the user from the proximity sensor 141. Generally, the proximity sensor 141 outputs a close signal when an object has come within a so-called "detection distance". Multiple proximity sensors having different detection distances may be used to determine object proximity by comparing close signals output from the multiple proximity sensors.

Multiple proximity sensors having different detection regions may also be provided on the mobile terminal 100 to determine both a region on the display unit 151 which an object has approached and whether or not an object has moved after approaching the display unit 151 by identifying which proximity sensor(s) has output a close signal among the multiple proximity sensors. The controller 180 may also perform a control operation to select a key corresponding to a location at which the user's finger or the like has approached the display unit 151 and to output a vibrating signal corresponding to the key.

When the user inclines or shakes the mobile terminal, the gyro sensor 142 detects a corresponding movement of the mobile terminal. The gyro sensor 142 generates a signal corresponding to the movement of the mobile terminal and outputs the signal to the controller 180. In addition, the controller 180 detects movement-related information such as moving direction, angle, speed, and current position of the mobile terminal from the signal generated by the gyro sensor 142.

The controller 180 tracks the movement of the mobile terminal through the information detected from the signal generated by the gyro sensor 142. Information that can be detected from the signal generated by the gyro sensor 142 may vary depending on the constituent parts of the gyro sensor 142. The gyro sensor 142 included in the mobile terminal is designed according to movement information of the mobile terminal that needs to be detected. The mobile terminal may include at least one gyro sensor 142. The controller 180 may control the gyro sensor 142 to operate only when a specific application is running according to information that needs to be detected.

Figure 3:
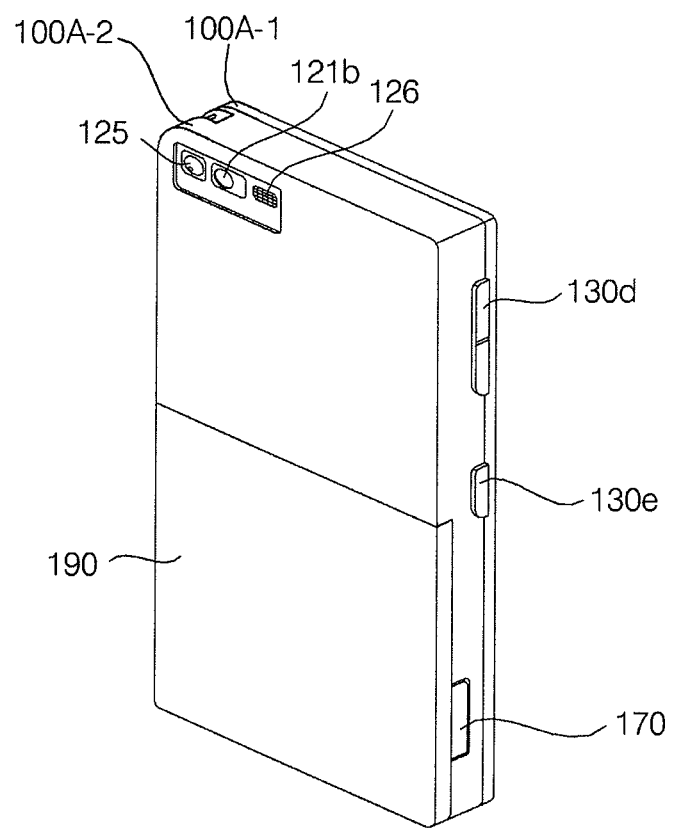
FIG. 3 is a rear perspective view of a mobile terminal according to an embodiment of the present invention.

Next, FIG. 3 is a rear perspective view of the mobile terminal shown in FIG. 2. As shown in FIG. 3, a fourth user input unit 130d, a fifth user input unit 130e, and an interface unit 170 are provided on a side surface of the rear case 100A-2 and a second camera 121b is additionally provided on a rear surface of the rear case 100A-2. Further, the second camera 121b may have a capture direction substantially opposite to that of the first camera 121a and have a different pixel resolution from that of the first camera 121a. For example, the first camera 121a preferably has a low pixel resolution such that it is suitable to capture and transmit an image of the face of the user, for example, in the case of video communication and the second camera 121b preferably has a high pixel resolution since, when the user captures a general object using the second camera 121b, the user generally does not immediately transmit the captured image.

A mirror 125 and a flash lamp 126 are also provided on the mobile terminal 100 near the second camera 121b. In particular, the mirror 125 allows the user to view their face or the like when capturing themselves using the second camera 121b (e.g., in the case of self-shooting), and the flash lamp 126 flashes light toward a subject when the subject is captured using the second camera 121b. A second audio output module (not shown) may be additionally provided on the rear case 100A-2 and implement a stereo function in conjunction with the first audio output module 153a and may be used to perform voice or video communication in a speakerphone mode.

In addition to an antenna for communication, an antenna for receiving broadcast signals may be provided on the rear case 100A-2 at a portion thereof. Each antenna may be mounted to be retractable from the rear case 100A-2. Further, the interface unit 170 is a channel through which the mobile terminal 100 can exchange data or the like with an external device. For example, the interface unit 170 may be at least one of a connection terminal for wired or wireless connection to an earphone, a port for local area communication, and power supply terminals for supplying power to the mobile terminal 100. The interface unit 170 may be a card socket for receiving an external card such as a Subscriber Identification Module (SIM), a User Identity Module (UIM), or a memory card for information storage.

A power supply unit 190 for supplying power to the mobile terminal 100 is also provided on the rear case 100A-2. The power supply unit 190 is, for example, a rechargeable battery which is detachably mounted to the rear case 100A-2 for the purpose of recharging or the like.

In addition, although the above description has been given with reference to an example where the second camera 121b is provided on the rear case 100A-2, the present invention is not limited to this example. When the second camera 121b is not provided, the first camera 121a may be formed to be rotatable so as to enable capturing in the same capture direction as that of the second camera 121b.

Figure 4:
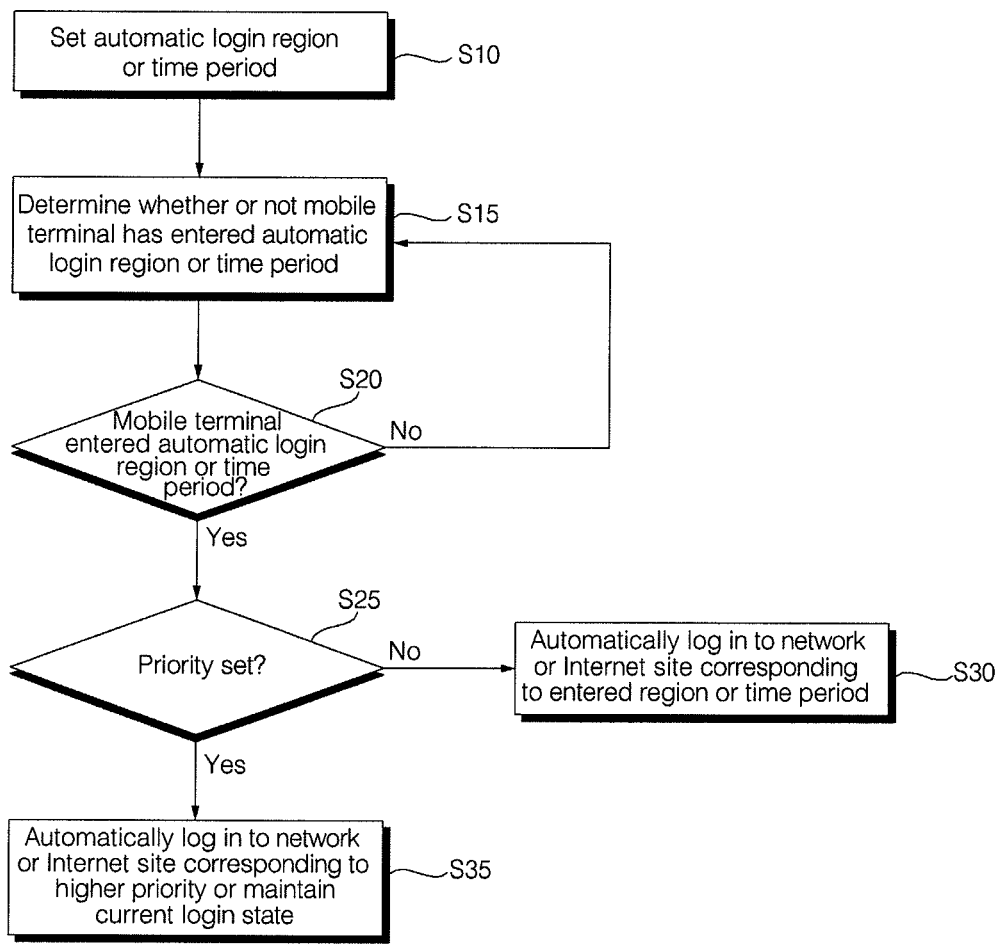
FIGS. 4 to 6 are flow charts illustrating a method for controlling the operation of a mobile terminal according to embodiments of the present invention.

Next, FIG. 4 is a flow chart illustrating a method for controlling the operation of a mobile terminal according to a first embodiment of the present invention. In this embodiment, a user of the mobile terminal may set a region or time period in which the mobile terminal automatically logs in to a specific network or Internet site. When the mobile terminal enters the region or time period set by the user, the mobile terminal may automatically log in to the network or Internet site according to information set by the user. FIG. 1 will also be referred to throughout the rest of the description of embodiments of the present invention.

In this embodiment, the network or Internet site which the mobile terminal 100 automatically logs in to may be a network or an Internet site established in a specific region. For example, the user may set the region of a company as an automatic login region of the mobile terminal 100 such that the mobile terminal 100 automatically logs in to a company Intranet when the mobile terminal 100 enters the region of the company. In addition, the user may set a specific time period as an automatic login time period of the mobile terminal 100 such that the mobile terminal 100 automatically logs in to a social networking site, which is one type of Internet site, when the mobile terminal has entered the specific time period.

The user can also create their account on a specific network or Internet site and upload content to the network or Internet site using the account. To access their content or user information on the specific network or Internet site, the user logs in to the network or Internet site. Further, the user can set a specific region or time period as an automatic login region or time period such that the mobile terminal 100 can access a desired network or Internet site without performing the login process when the mobile terminal 100 has entered the specific region or time period. The user can also set at least two automatic login regions or time periods and set a priority for each automatic login region or time period when setting the automatic login region or time period. The method for controlling the operation of a mobile terminal according to this embodiment will now be described with reference to FIG. 4.

As shown in FIG. 4, the user sets a region or time period in which the mobile terminal 100 automatically logs in to a specific network or Internet site (S10). The user can set a region, in which the mobile terminal 100 automatically logs in to a specific network or Internet site, using a map displayed on the mobile terminal 100. The user can also set a time period, in which the mobile terminal 100 automatically logs in to a specific network or Internet site, using a clock displayed on the mobile terminal 100, and set a region or time period, in which the mobile terminal 100 automatically logs in to a specific network or Internet site, with reference to a login history of the specific network or Internet site.

When a region or time period in which the mobile terminal 100 automatically logs in to a specific network or Internet site has been set, the controller 180 determines whether or not the mobile terminal has entered the set automatic login region or time period (S15). For example, the controller 180 can identify where the mobile terminal is located using a GPS module provided in the controller 180. In this instance, when the mobile terminal 100 is located in an automatic login region, the controller 180 automatically logs in to a specific network or Internet site which the mobile terminal 100 has been set to automatically log in to when in the automatic login region. The controller 180 can also determine the current time. In this instance, when the mobile terminal 100 has entered an automatic login time period, the controller 180 automatically logs in to a specific network or Internet site which the mobile terminal 100 has been set to automatically log in to during the automatic login time period.

When the mobile terminal 100 has entered an automatic login region or time period (Yes in S20), the controller 180 determines whether or not a priority has been set for the automatic login region or time period (S25). When no priority has been set for the entered automatic login region or time period (No in S25), the controller 180 automatically logs in to the specific network or Internet site which the mobile terminal 100 has been set to automatically log in to in the automatic login region or time period (S30).

When priority has been set for the entered automatic login region or time period (Yes in S25), the controller 180 checks the priority set for the entered automatic login region or time period. When a higher priority has been set for the entered automatic login region or time period, the controller 180 automatically logs in to the specific network or Internet site which the mobile terminal has been set to automatically log in to in the entered automatic login region or time period. When automatic login information set for the entered region or time period collides with existing automatic login information and priority of the automatic login information set for the entered region or time period is lower than priority of the existing automatic login information, the controller 180 maintains an automatic login state corresponding to the existing automatic login information (S35).

The user can also set automatic logout information while setting automatic login information. In one example, the user can also set an automatic logout time period while setting an automatic login time period. Thus, when the mobile terminal 100 has entered the automatic logout time period, the mobile terminal 100 automatically logs out of the automatically logged-in network or Internet site. In another example, the user may set the mobile terminal 100 to automatically logout when the mobile terminal 100 has moved a predetermined distance away from the automatic login region. Accordingly, the controller 180 detects the position of the mobile terminal 100 and automatically logs out of the automatically logged-in network or Internet site when the position of the mobile terminal 100 is more than a predetermined distance away from the automatic login region.

The controller 180 can also change a display state of the display unit 151 when the mobile terminal 100 has logged in to a specific network or Internet site. In one example, the controller 180 can display an icon corresponding to each network or Internet site, which the mobile terminal 100 may automatically log in to, on the display unit 151. The controller 180 can also change the color of the icon or the like according to whether or not the mobile terminal 100 has logged in to the network or Internet site. This allows the user to confirm information regarding each network or Internet site which the mobile terminal 100 has automatically logged in to. In another example, when the mobile terminal 100 has automatically logged in to or logged out of a specific network or Internet site, the controller 180 can display related information on the display unit 151 using an icon or a popup window. Although this embodiment has been described above with reference to an example in which the mobile terminal 100 changes a display state of the display unit to allow the user to confirm automatic login related information, this example should not be construed as limiting the scope of the present invention.

Figure 5:
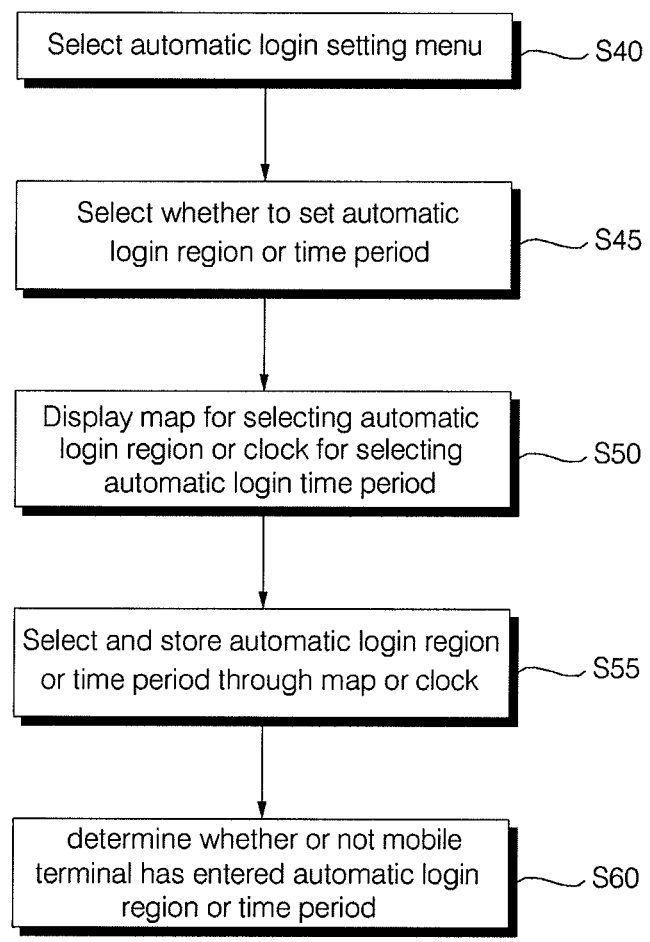

Next, FIG. 5 is a flow chart illustrating a method for controlling the operation of the mobile terminal 100 according to a second embodiment of the present invention. In this embodiment, a more detailed description will be given of an example of the setting of an automatic login region or time period in the mobile terminal 100. For example, the mobile terminal 100 can display a map or clock on the display unit to allow the user to set an automatic login region or time period. The user can then set a region or time period in which the mobile terminal 100 automatically logs in using the displayed map or clock.

With reference to FIG. 5, the user selects a menu item for setting automatic login information from a menu displayed on the display unit 151 of the mobile terminal 100 (S40). For each network or Internet site, the user can set a region or time period in which the mobile terminal 100 automatically logs in to the network or Internet site. When the user has selected the menu for setting automatic login information, the controller 180 checks whether the user desires to set an automatic login region or an automatic login time period (S45). Specifically, through a submenu in the automatic login information setting menu, the user can select whether to set an automatic login region or to set an automatic login time period.

The controller 180 also displays a map or clock for setting automatic login information on the display unit 151 in response to the selection of the user (S50). In one example, the controller 180 displays a map on the display unit 151 when the user has selected automatic login region setting. In another example, the controller 180 displays a clock on the display unit 151 when the user has selected automatic login time period setting. Other icons or images may be displayed instead of or in addition to the map and/or clock.

The user can then select and store an automatic login region or time through the map or clock displayed on the display unit 151 (S55). In one example, when the display unit 151 is a touch screen, the user can select a region in which the mobile terminal 100 automatically logs in to the network or Internet site by touching a corresponding region on the map displayed on the display unit 151. In addition, when the display unit 151 is a touch screen, the user can select a time period in which the mobile terminal 100 automatically logs in to the network or Internet site by adjusting an hour hand and a minute hand of the clock displayed on the display unit 151.

When the automatic login information has been set in the mobile terminal, the controller 180 determines whether or not the mobile terminal 100 has entered the automatic login region or time period (S60). When it is determined that the mobile terminal 100 has entered the automatic login region or time period, the mobile terminal 100 logs in to the corresponding network or Internet site according to the automatic login information.

Figure 6:
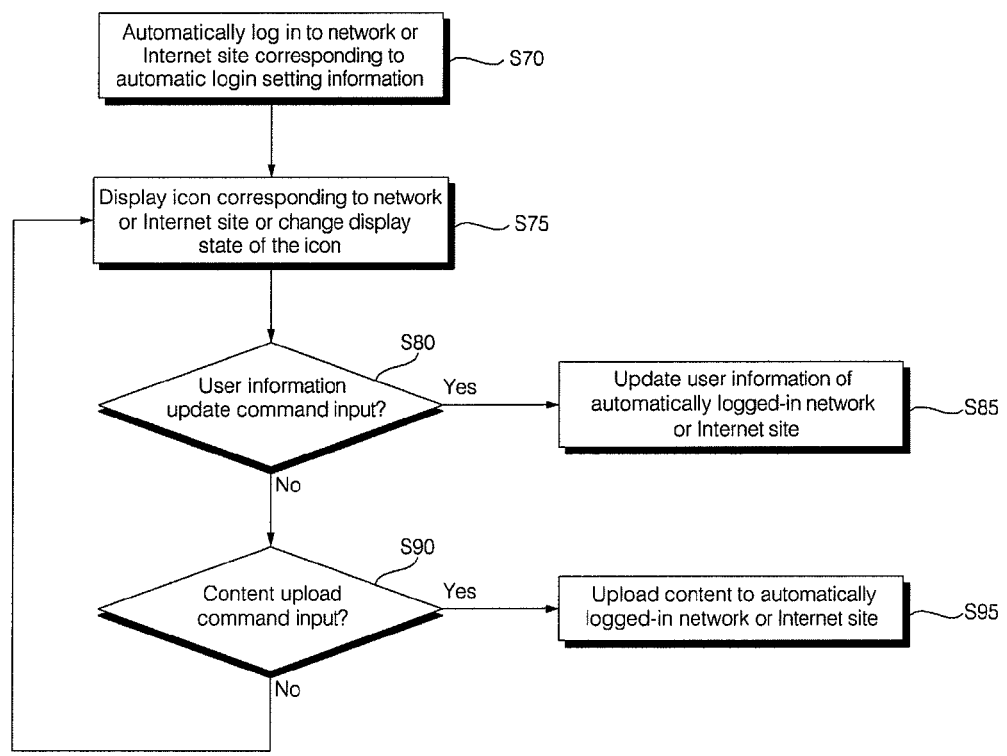

Next, FIG. 6 illustrates a method for controlling the operation of a mobile terminal 100 according to a third embodiment of the present invention. In this embodiment, the user can update user information of the automatically logged-in network or Internet site or upload content to the automatically logged-in network or Internet site. The user can then determine whether or not the mobile terminal 100 has automatically logged in to a network or Internet site using a corresponding icon or the like displayed on the display unit 151.

When the mobile terminal 100 has entered an automatic login region or time period, the controller 180 of the mobile terminal 100 automatically logs in to a network or Internet site corresponding to automatic login setting information (S70). When the mobile terminal 100 has automatically logged in to a network or Internet site, the controller 180 can display an icon corresponding to the network or Internet site on the controller 180. In another example, when an icon corresponding to a network or Internet site which the mobile terminal 100 may automatically log in to is displayed on the display unit 151, the controller 180 can change a display state of the icon corresponding to the automatically logged-in network or Internet site (S75). This allows the user to confirm both whether or not the mobile terminal 100 has automatically logged in to the network or Internet site and information regarding the automatically logged-in network or Internet site. The icon corresponding to the network or Internet site may be included in a widget or toolbar including a network or Internet site related menu or the like.

In this embodiment, the controller 180 can display a menu or icon, which allows the user to input a command to the mobile terminal 100 to update user information of the automatically logged-in network or Internet site, on the display unit 151. If the user selects the user information update menu or icon, then the controller 180 determines that a user information update command has been input to the mobile terminal 100 (Yes in S80) and updates the user information of the automatically logged-in network or Internet site (S85). The user information may be information that the user has directly input to the mobile terminal 100 or may be information that is provided by default to the mobile terminal. In one example, the user can update user information of the automatically logged-in network or Internet site by editing information regarding the position of the user or the like stored in the network or Internet site.

In another example, user information of a network or Internet site may be set to be updated when the mobile terminal 100 automatically logs in to the network or Internet site as the mobile terminal 100 enters a corresponding region. In this instance, it is possible to update the user position information in the network or Internet site when the mobile terminal 100 enters the corresponding region and automatically logs in to the network or Internet site without the user inputting an update command to the mobile terminal. This embodiment should not be construed as limiting the scope of the present invention.

In an embodiment of the present invention, a menu or icon, which allows the user to input a command to the mobile terminal 100 to upload content to the automatically logged-in network or Internet site, can be displayed on the display unit 151. Then, when the user has selected such a content upload menu or icon, the controller 180 determines that a content upload command has been input to the mobile terminal 100 (Yes in S90) and uploads the content to the automatically logged-in network or Internet site (S95). The content may be a still or moving image (i.e., a photograph or video) stored in the mobile terminal 100 or generated through the camera 121a of the mobile terminal 100. In this embodiment, the user can capture a still or moving image using the camera 121 after inputting a content upload command to the mobile terminal 100. Further, the controller 180 can upload content such as a still or moving image, which is generated by the mobile terminal 100 after the content upload command is input, to the network or Internet site.

In another example, when content such as a still or moving image has been generated through the camera 121a after the mobile terminal 100 automatically logs in to the network or Internet site, the controller 180 can display a content upload command menu or icon on the display unit 151 or determine that a content upload command has been input to the mobile terminal. In this instance, the mobile terminal 100 can upload content to the network or Internet site when the content has been generated or the content upload command menu or icon has been selected. This embodiment should not be construed as limiting the scope of the present invention.

Figure 7:
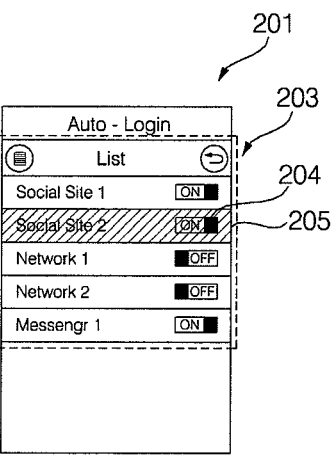
Figure 7:
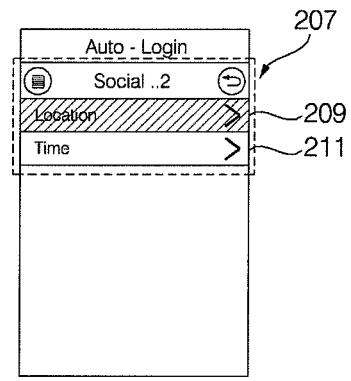
Figure 7:
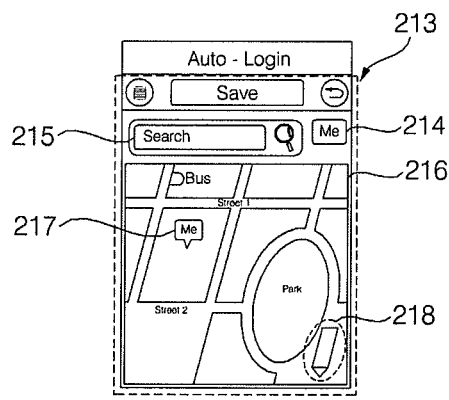
Figure 7:
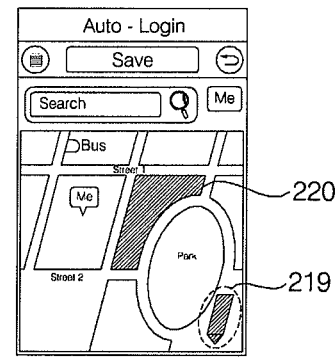

Next, FIGS. 7(a) to 7(d) illustrate screenshots of the mobile terminal 100 according to a fourth embodiment of the present invention. In this embodiment, the user can set an automatic login region through a map displayed on the display unit 151. When the user has input an automatic login information setting command to the mobile terminal 100, the controller 180 displays a screen 201 on the display unit 151 as shown in FIG. 7(a). As shown, the screen 201 includes a list window 203 of networks or Internet sites which allows the user to set automatic login information. The list window 203 includes network or Internet site items which allow setting of automatic login information. An icon 204 indicating whether or not the mobile terminal 100 has logged in a corresponding network or Internet site can also be displayed on each item. In this example, it is assumed that the user desires to set automatic login information for Social Site 2. Accordingly, the user inputs a command to the mobile terminal 100 to select an item 205 from among the items of the list window 203. The command to select the item 205 is input to the mobile terminal 100 when the item 205 is touched or when a soft key corresponding to the item 205 is operated.

When a command to select the item 205 is input to the mobile terminal 100, the controller 180 displays a setting window 207, which allows the user to set automatic login information for Social Site 2, on the display unit 151 as shown in FIG. 7(b). Using the setting window 207, the user can select whether to set an automatic login region or to set an automatic login time period. When the user has selected an item 209 from among items of the setting window 207, the controller 180 displays a setting window 213 on the display unit 151 as shown in FIG. 7(c). The user can set an automatic login region using the setting window 213. When the user has selected an item 211 from among items of the setting window 207, the controller 180 displays a window, which allows the user to set an automatic login time period, on the display unit 151. The user can input a command to select the item 209 to the mobile terminal 100 by touching the item 209 among the items of the setting window 207.

The setting window 213 of FIG. 7(c) may include an icon 214 allowing the user to input a command to display the current position of the mobile terminal 100 on the map and a search window 215 allowing the user to input a command to search for a desired location on the map. The setting window 213 also includes an icon 217 indicating the current position of the mobile terminal on the map and an icon 218 allowing the user to input a command to select an automatic login region.

When the user has selected the icon 218 through touching or the like, the controller 180 changes the displayed icon 218 to an icon 219. The user can select a region 220 on the map through touching or the like. In this example, using the mobile terminal, the user sets information requesting the mobile terminal 100 to automatically log in to Social Site 2 when entering the region 220. Accordingly, the mobile terminal 100 automatically logs in to Social Site 2 when it has entered the region 220.

Figure 8:
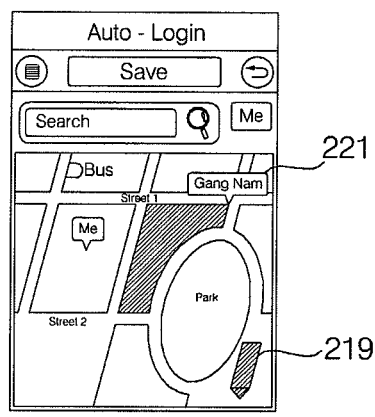
Figure 8:
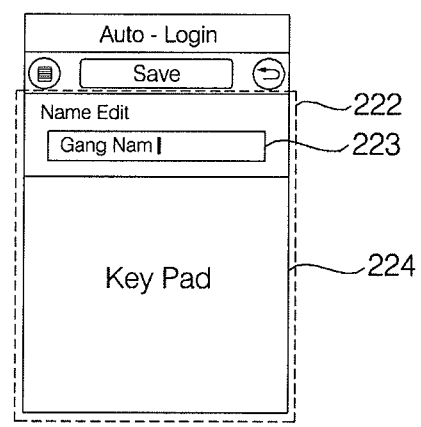
Figure 8:
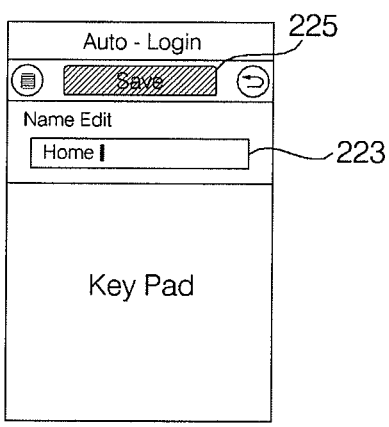
Figure 8:
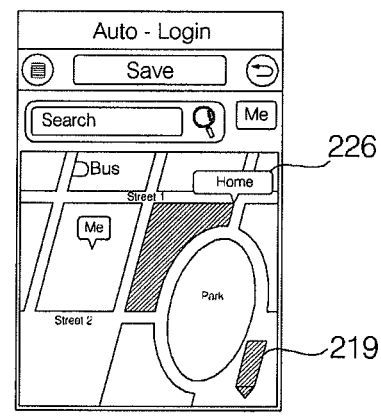

FIGS. 8(a) to 8(d) illustrate screenshots of the mobile terminal 100 according to a fifth embodiment of the present invention. In this embodiment, the user can change a name of each automatic login region after selecting the region using the mobile terminal. If the region 220 is touched while the icon 219 is displayed, the controller 180 displays an icon 221 as shown in FIG. 8(a). The icon 221 indicates information corresponding to the selected region. The user can then select the icon 221 through touching or the like.

When the icon 221 has been selected, the controller 180 displays a region name change window 222 on the display unit 151 as shown in FIG. 8(b). The region name change window 222 includes a keypad 224 and a text editing window 223 on which text edited using the keypad 224 is displayed. Further, the user can input a storage command to the mobile terminal by selecting an icon 225 after inputting a region name corresponding to the region 220 to the text editing window 223 using the keypad as shown in FIG. 8(c). When the storage command has been input to the mobile terminal 100 after the region name is edited, the controller 180 displays the edited region name through an icon 226.

Figure 9:
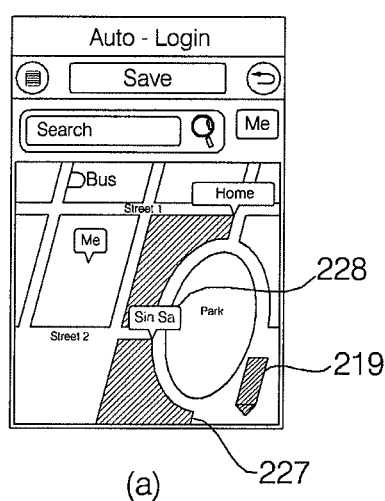
Figure 9:
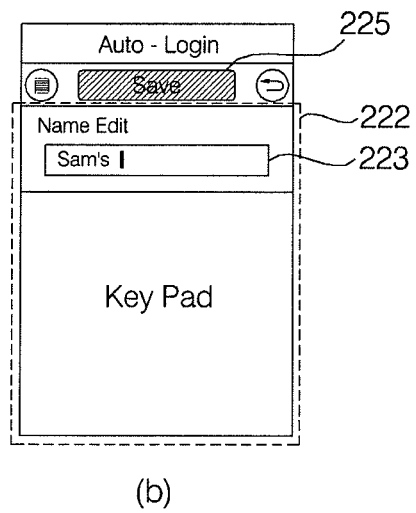
Figure 9:
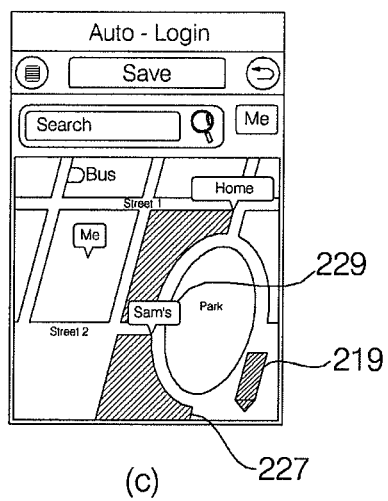
Figure 9:
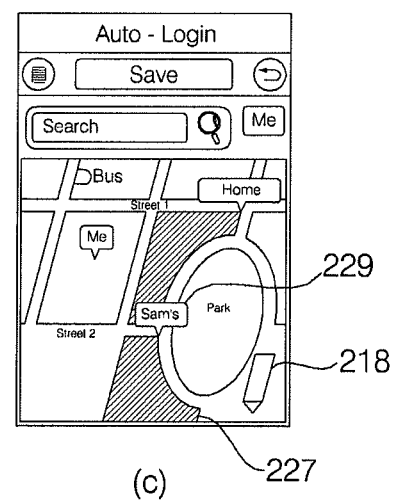

Next, FIGS. 9(a) to 9(d) illustrate screenshots of the mobile terminal 100 can select a region 227 as shown in FIG. 9(a) after editing the region name corresponding to the region 220. The controller 180 then displays a region name corresponding to the region 227 through an icon 228. When the user has selected the icon 228 through touching or the like, the controller 180 displays a region name change window 222 on the display unit 151 as shown in FIG. 9(b). The user changes a region name corresponding to the region 227 as indicated in the text editing window 223 through the region name change window 222. The user then selects an icon 225 to input a storage command to the mobile terminal.

When the storage command has been input to the mobile terminal 100 after the region name corresponding to the region 227 is edited, the controller 180 changes the region name corresponding to the region 227 as indicated on the icon 229 as shown in FIG. 9(c). In this example, the user can select and store at least two automatic login regions on the map. The user can also edit and store region names of the selected regions. Further, the user can touch the icon 219 shown in FIG. 9(c). In this case, the mobile terminal determines that a command to complete automatic login region setting has been input. The controller 180 then changes the icon 219 to an icon 218 as shown in FIG. 9(d). This allows the user to confirm that the automatic login region setting has been completed.

Figure 10:
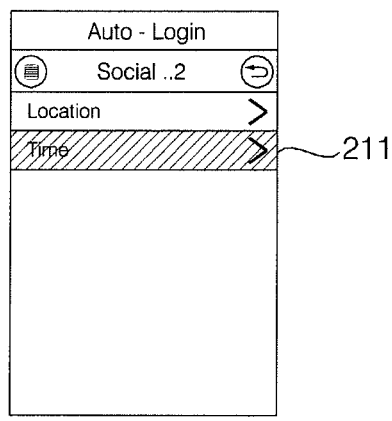
Figure 10:
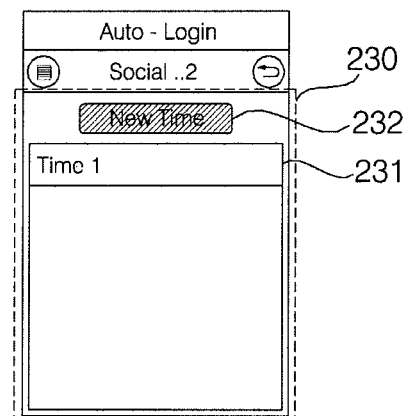
Figure 10:
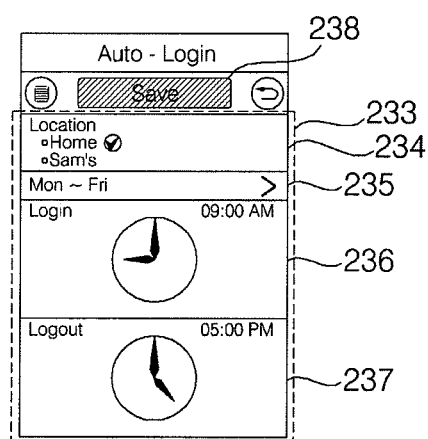
Figure 10:
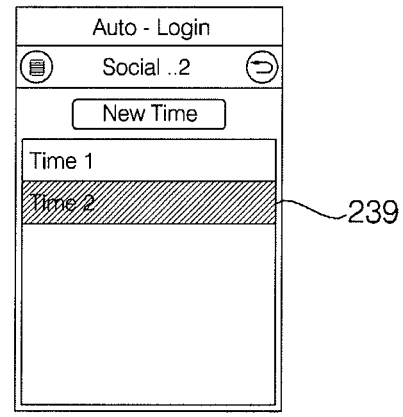

FIGS. 10(a) to 10(d) illustrate screenshots the mobile terminal 100 according to a seventh embodiment of the present invention. In this embodiment, the user can select an item 211 through touching or the like as shown in FIG. 10(a). When the item 211 has been selected, the controller 180 displays a setting window 230 on the display unit 151 as shown in FIG. 10(b). In this embodiment, the setting window 230 includes an item 231 corresponding to an automatic login time period that has been previously stored and an icon 232 that allows the user to input a command to set a new automatic login time period.

When the user has selected the icon 232 through touching or the like, the controller 180 displays a setting window 233 on the display unit 151 as shown in FIG. 10(c). In this embodiment, the user can set an automatic login time period for each automatic login region. Accordingly, the setting window 233 includes a window 234 indicating information regarding automatic login time periods set for Social Site 2, a window 235 allowing setting of automatic login date information, a window 236 allowing setting of an automatic login time period, and a window 237 allowing setting of an automatic logout time.

In this example, the user can set automatic login time period information of a region "Home" among the automatic login regions of Social Site 2 through the window 234. Through the window 235, the user sets the automatic login time period information such that the mobile terminal automatically logs in to the Social Site 2 at Home from Monday to Friday. The user also sets a login time to 9 AM through the window 236 and sets a logout time to 5 PM through the window 237. When the user has selected an icon 238 through touching or the like, the mobile terminal determines that automatic login time period setting is completed. Accordingly, the controller 180 displays an item 239 corresponding to the newly set automatic login time period information on the setting window 230 as shown in FIG. 10(d).

Figure 11:
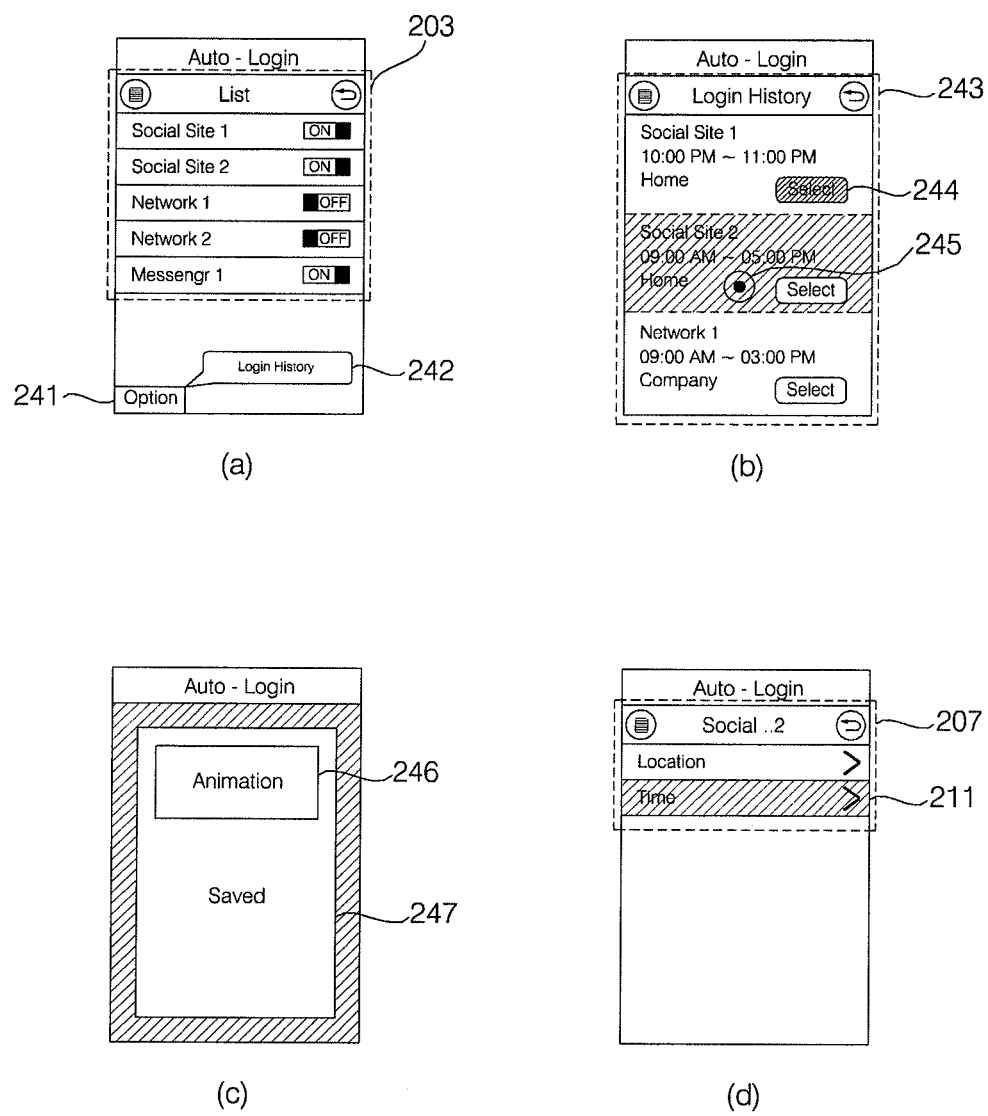

FIGS. 11(a) to 11(d) illustrate screenshots of the mobile terminal 100 according to an eighth embodiment of the present invention. In this embodiment, the controller 180 displays an option icon 241 on the list window 203 as shown in FIG. 11(a). When the user has selected the option icon 241 through touching or the like, the controller 180 displays a menu associated with the list window 203 on the display unit 151. In this embodiment, when the option icon 241 has been selected, the controller 180 displays an icon 242 corresponding to a command to display login histories of networks or Internet sites included in the list window 203 as shown in FIG. 11(a).

When the user has selected the icon 242 through touching or the like, the controller 180 displays a login history window 243 on the display unit 151 as shown in FIG. 11(b). The login history window 243 includes respective login history items of the networks or Internet sites included in the list window 203. The user can select a "select" icon included in a login history item, for which the user desires to perform automatic login setting, among the login history items to set the login history of the selected item as automatic login information. The user can also set automatic login information of a network or Internet site corresponding to the login history item by selecting a text region in the login history item.

That is, when the user has selected an icon 244 displayed on the display unit 151 of FIG. 11(b), the controller 180 sets automatic login information of a corresponding network or Internet site according to history information included in the icon 244. The icon 244 is included in the login item Social Site 1. It can be seen from FIG. 11(b) that the mobile terminal logged in to Social Site 1 from 10 PM to 11 PM at Home. Accordingly, the controller 180 automatically logs in to Social Site 1 when the mobile terminal is located at Home from 10 PM to 11 PM.

The controller 180 also sets the history information of the item including the icon 244 as automatic login information for the Social Site 1 and displays a window 247 indicating that setting has been completed on the display unit 151 as shown in FIG. 11(c). The controller 180 also displays an animation 246 on the window 247. The animation 246 may be an animation that has been set to be reproduced by default, that is reproduced in text indicating the set automatic login information, etc.

On the other hand, when the user has selected the region 245 of FIG. 11(b), the controller 180 determines that a command to set an automatic login time period for Social Site 2 corresponding to the region 245 has been input. Accordingly, the controller 180 displays a setting window 207, which allows automatic login information setting, on the display unit 151 as shown in FIG. 11(d).

Figure 12:
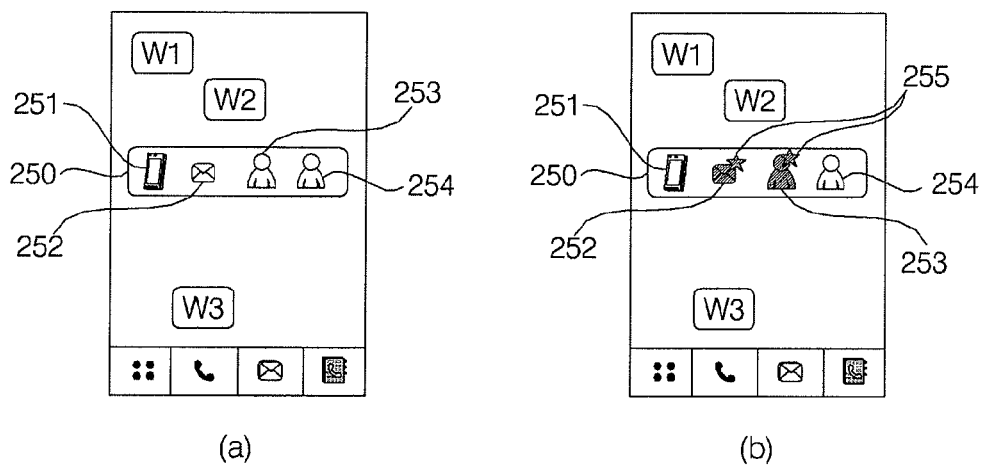

Next, FIGS. 12(a) and 12(b) illustrate screenshots of the mobile terminal 100 according to a ninth embodiment of the present invention. When the mobile terminal 100 is in a standby mode, the controller 180 displays a widget, a toolbar, and icons corresponding to networks or Internet sites, each of which changes its display state depending on whether or not the mobile terminal 100 has logged in to the corresponding network or Internet site, on a standby screen.

In addition, when the mobile terminal 100 is in a standby mode, the controller 180 displays widgets W1, W2, and W3, and a toolbar 250 on the standby screen as shown in FIG. 12(a). The toolbar 250 includes icons 251, 252, 253, and 254. The icon 251 is a shortcut icon which allows the user to input a command to call a phone number to the mobile terminal, the icon 252 is a shortcut icon which allows the user to input a command to execute an email application to the mobile terminal, and the icons 253 and 254 are shortcut icons, each of which allows the user to input a command to the mobile terminal to connect to a corresponding Internet site.

In this embodiment, when the mobile terminal has automatically logged in to a network or Internet site, the controller 180 changes the display state of an icon corresponding to the network or Internet site as shown in FIG. 12(b). Specifically, when the mobile terminal has automatically logged in to an email network corresponding to the icon 252 according to automatic login information set by the user, the controller 180 changes the display state of the icon 252 as shown in FIG. 12(b). In addition, when the mobile terminal has automatically logged in to an Internet site corresponding to the icon 253 according to automatic login information set by the user, the controller 180 changes the display state of the icon 253 as shown in FIG. 12(b). This allows the user to know that the mobile terminal has automatically logged in to the network and the Internet site corresponding respectively to the icon 252 and the icon 253. The controller 180 also display an icon 255 on each of the icons 252 and 253 corresponding to the logged-in network and Internet site as shown in FIG. 12(b). Through the icon 255, the user can determine that the mobile terminal 100 has automatically logged in to the network and Internet site corresponding to the icons 252 and 253.

Figure 13:
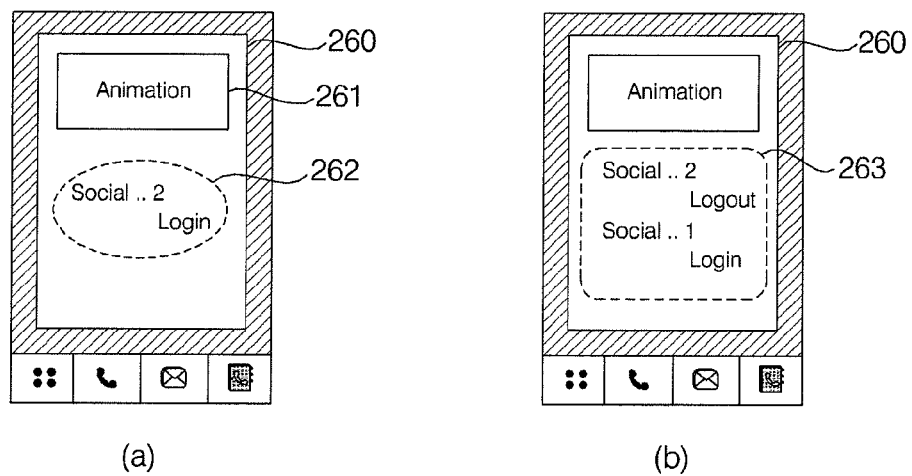

FIGS. 13(a) and 13(b) illustrate screenshots of the mobile terminal 100 according to a tenth embodiment of the present invention. The mobile terminal 100 in this embodiment of the present invention indicates information as to whether or not the mobile terminal has automatically logged in through an icon or a popup window. In this embodiment, the mobile terminal 100 displays (or indicates) information regarding whether or not the mobile terminal 100 has automatically logged in through a popup window.

For example, when the mobile terminal 100 has automatically logged in to Social Site 2, the controller 180 displays an automatic login information window 260 on the display unit 151. The automatic login information window 260 may indicate information regarding a network or Internet site which the mobile terminal has automatically logged in to through text. The controller 180 also displays information regarding whether or not the mobile terminal has automatically logged in to Social Site 2 through text 262 as shown in FIG. 13(a). The controller 180 also displays the automatic login information through an animation 261. The animation 261 may be an animation that has been set to be displayed on the display unit 151 when an automatic login or automatic logout event has occurred, and may indicate information regarding a network or Internet site into or out of which the mobile terminal has automatically logged.

When the mobile terminal 100 has exited an automatic login region set by the user or when an automatic login time period set by the user has passed, the controller 180 logs out of the automatically logged-in network or Internet site. When a network or Internet site logout event has occurred, the controller 180 can display information regarding the event through text 263 as shown in FIG. 13(b). In this example, the controller 180 displays the text 263 indicating that the mobile terminal has automatically logged out of Social Site 2 and has automatically logged in to Social Site 1.

FIGS. 14(a) to 14(d) illustrate screenshots of the mobile terminal 100 according to an eleventh embodiment of the present invention. In this embodiment, the controller 180 displays a toolbar 300 including icons corresponding to networks or Internet sites on the display unit 151. The toolbar 300 may be displayed on a standby screen of the mobile terminal 100 and include an icon 301 corresponding to Social Site 1, an icon 302 corresponding to Social Site 2, an icon 303 corresponding to Network 1, an icon 304, which allows the user to input a command to the mobile terminal to update user information of a network or Internet site, and an icon 305 which allows the user to input a command to the mobile terminal to upload content to a network or Internet site.

Figure 14:
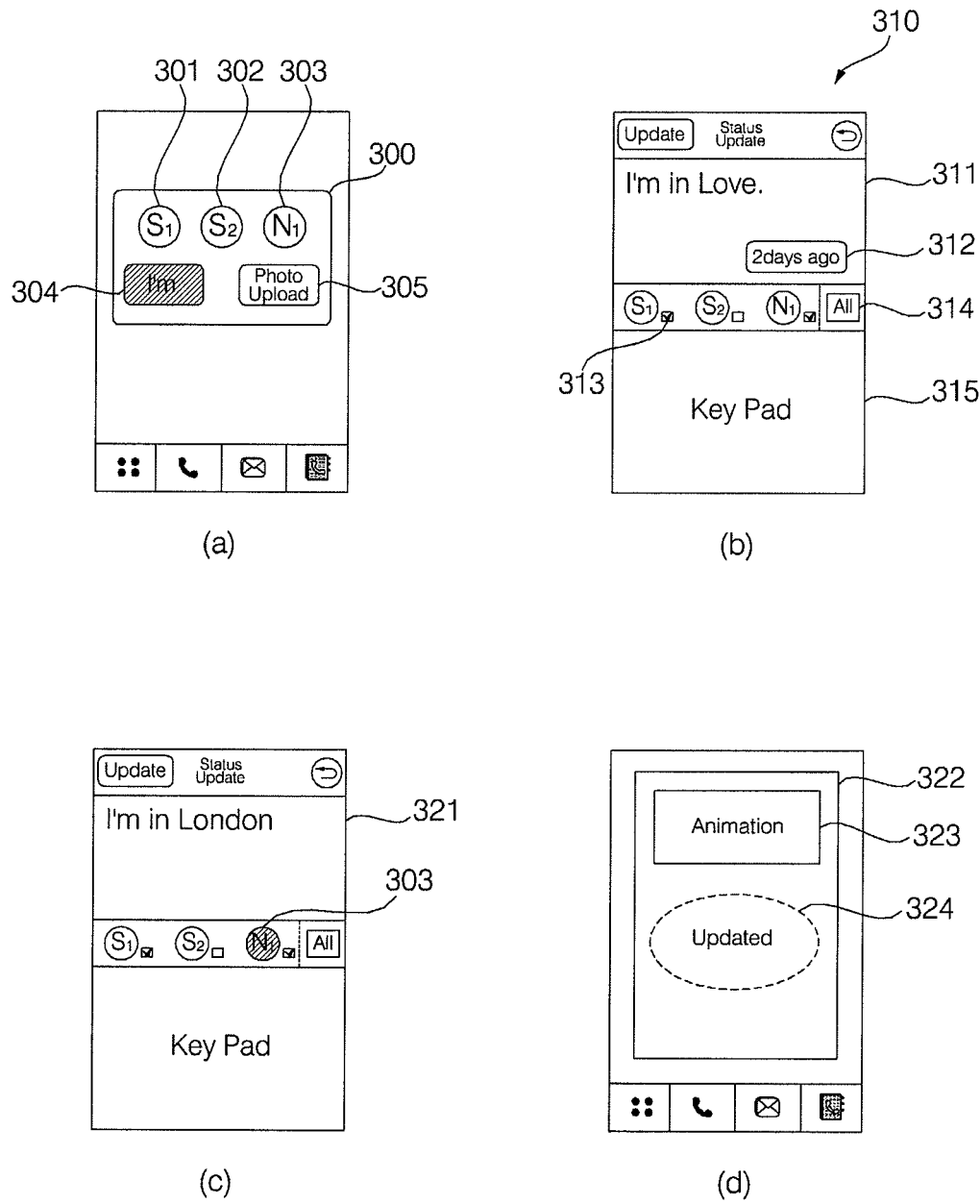

The controller 180 also displays icons 301 to 303, each of which allows the user to input a command to the mobile terminal to display a homepage of a network or Internet site, on the toolbar 300 as shown in FIG. 14(*a*). The controller 180 can also change the display state of each of the icons 301 to 303 such as color or size according to whether or not the mobile terminal has automatically logged in to a corresponding network or Internet site. In another example, the controller 180 can display, on the toolbar 300, only an icon corresponding to a network or Internet site which the mobile terminal 100 has automatically logged in to according to automatic login information set by the user.

Further, the controller 180 can change the display state of each of the icons 304 and 305 such as color or size according to whether or not a corresponding function is enabled. In another example, the controller 180 can display the icon 304 on the toolbar 300 only when a command to update user information of the networks or Internet sites corresponding to the icons 301 to 303 can be implemented. In another example, the controller 180 can display the icon 305 on the toolbar 300 only when a command to upload content to the networks or Internet sites corresponding to the icons 301 to 303 can be implemented.

When the user has selected the icon 304 through touching or the like, the controller 180 displays a user information update screen 310, which allows the user to update user information, on the display unit 151 as shown in FIG. 14(*b*). The user information update screen 310 includes a window 311 indicating user information of a network or Internet site prior to update, an icon 312 indicating information regarding a time at which user information was last updated, a keypad 315 which allows the user to input user information to be updated, a box 313 displayed to one side of an icon corresponding to each network or Internet site to allow the user to select a network or Internet site to be updated, and an icon 314 which allows the user to input a command to update user information of all selected networks or Internet sites.

The user can then input user information to be updated to the mobile terminal using the keypad 315. The controller 180 displays user information which the user desires to update in a window 321 as shown in FIG. 14(*c*). The user can then select the icon 303 through touching or the like after completing editing of user information to be updated. When the user has selected the icon 303 after completing editing of user information to be updated, the controller 180 determines that a command to update user information of Network 1 corresponding to the icon 303 has been input.

Accordingly, the controller 180 displays a user information update completion window 322 on the display unit 151 as shown in FIG. 14(*d*). The user information update completion window 322 can include text 324 indicating that update has been completed and an animation 323 indicating updated network or Internet site information or updated user information.

Figure 15:
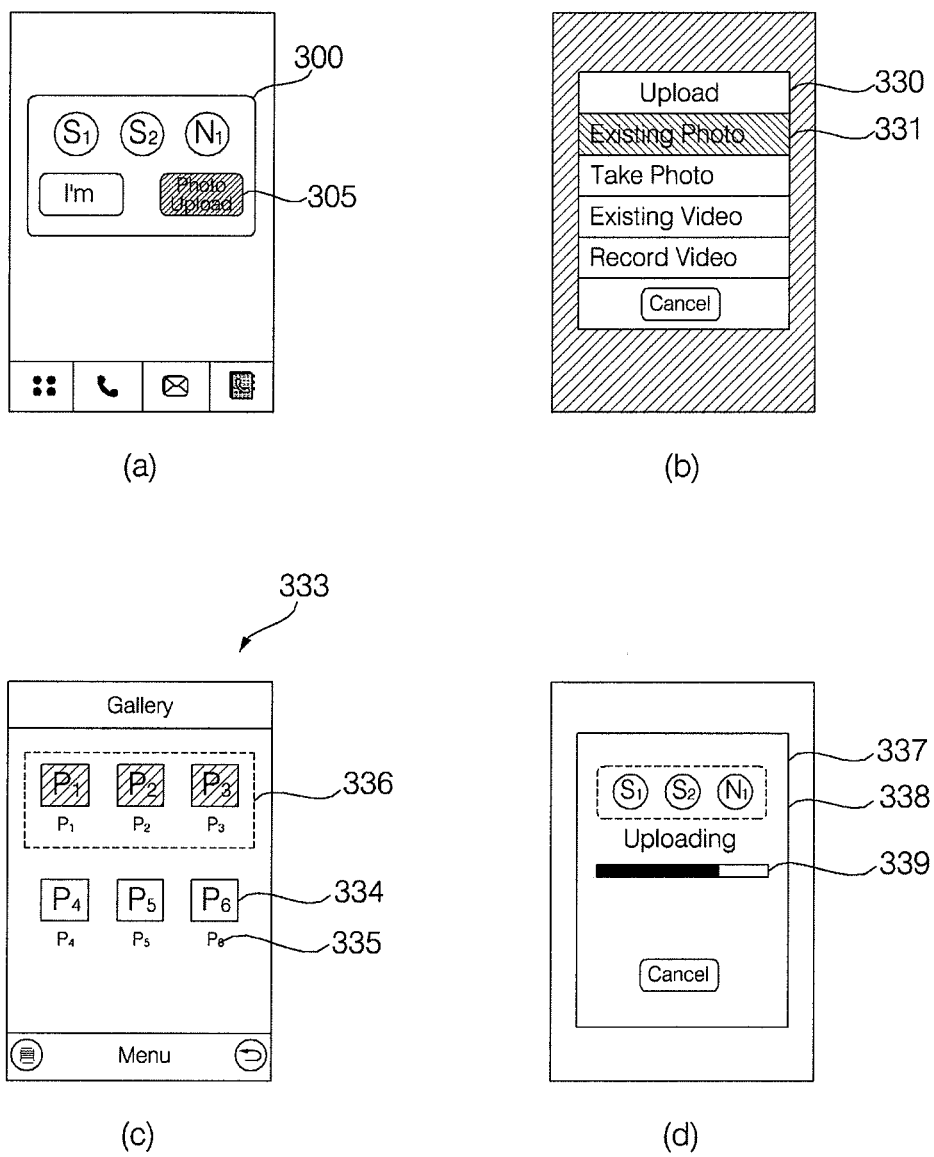

FIGS. 15(*a*) to 15(*d*) illustrate screenshots of the mobile terminal 100 according to a twelfth embodiment of the present invention. In this embodiment, the user can upload content to a network or Internet site which the mobile terminal 100 has automatically logged in to or a network or Internet site displayed on a toolbar 300 by selecting an icon 305 from among icons on the toolbar 300 through touching or the like as shown in FIG. 15(*a*).

When the user has selected the icon 305, the controller 180 displays an upload list window 330 which allows the user to select content to be uploaded as shown in FIG. 15(*b*). In this embodiment, the user can upload a still image (or photograph) stored in the mobile terminal 100 to a desired network or Internet site. The user may input a command to upload a still image stored in the mobile terminal 100 by selecting the item 331 through touching or the like. The user can also upload a moving image (or video) stored in the mobile terminal 100 to a desired network or Internet site or upload a new still or moving image captured using the camera to a desired network or Internet site.

When the user has selected the item 331, the controller 180 displays a gallery screen 333 including still images stored in the mobile terminal 100 on the display unit 151 as shown in FIG. 15(*c*). The user can then select a still mage to be uploaded to a desired network or Internet site among still images on the gallery screen 333. The gallery screen 333 displays the still images stored in the mobile terminal 100 through a thumbnail 334 and file names 335 as shown in FIG. 15(*c*). In this example, the user may select a still image corresponding to the region 336.

The controller 180 uploads a still image selected by the user to a desired network or Internet site. The controller 180 also displays a content upload screen 337 on the display unit 151 as shown in FIG. 15(*d*) while uploading a still image to a desired network or Internet site. In this example, the content upload screen 337 includes an icon 338 corresponding to a network or Internet site to which content is currently being uploaded and an indicator 339 of the current upload progress.

FIGS. 16(*a*) to 16(*c*) illustrate the mobile terminal 100 according to a thirteenth embodiment of the present invention. In this embodiment, the controller 180 displays toolbars 341 and 342, each including a menu corresponding to a network or Internet site, on the display unit 151 as shown in FIG. 16(*a*). The toolbar 341 includes an icon corresponding to the login state of Social Site 1 and an icon which allows the user to input a command associated with Social Site 1 to the mobile terminal. The toolbar 342 includes an icon corresponding to the login state of Social Site 2 and an icon which allows the user to input a command associated with Social Site 2 to the mobile terminal. In the example of FIG. 16(*a*), the mobile terminal 100 has logged in to Social Site 1 and has logged out of Social Site 2.

The user can then select an icon 343 from among the icons of the toolbar 341 through touching or the like as shown in FIG. 16(*b*) to update user information of Social Site 1. The user can also select an icon 344 from among the icons of the toolbar 341 through touching or the like as shown in FIG. 16(*c*) to upload content to Social Site 2. In this embodiment, the user can individually update user information of each network or Internet site and can individually upload content to each network or Internet site.

In summary, embodiments of the present invention provide a mobile terminal which can automatically log in to a desired network or Internet site when the mobile terminal has entered a predetermined region or time period. The user can also set a region or time period for a network or Internet site such that the mobile terminal can access its personal account established in the network or Internet site without performing a process for logging in to the network or Internet site when the mobile terminal has entered the set region or time period.

The mobile terminal and the method of controlling the operation of the same according to the present invention are not limited in their applications to the configurations and methods of the embodiments described above and all or some of the embodiments may be selectively combined to implement various modifications.

The method for controlling the mobile terminal according to the present invention can be embodied as processor readable code on a processor readable medium provided in a mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling an operation of a mobile terminal, the method comprising:
    setting an automatic login geographical region within the mobile terminal for automatically logging into a network or Internet site by the mobile terminal when the mobile terminal enters the automatic login geographical region;
    entering, via a controller, the mobile terminal into a standby mode;
    displaying a standby screen on a display unit of the mobile terminal during the standby mode;
    displaying a plurality of icon indicators on the standby screen corresponding to different network or Internet sites;
    determining by the mobile terminal whether or not the mobile terminal has entered or exited the automatic login geographical region and generating a corresponding determination result;
    automatically logging into the network or Internet site by the mobile terminal if the determination result indicates that the mobile terminal has entered the automatic login geographical region; and
    updating a corresponding icon indicator among the plurality of icon indicators to indicate that the corresponding network or Internet site has been automatically logged into.

2. The method according to claim 1, wherein the plurality of icon indicators are displayed within a toolbar on the standby screen.

3. The method according to claim 1, further comprising:
    setting different priorities for different network or Internet sites for the automatic login geographical region;
    determining which network or Internet site among the different network or Internet sites has a highest priority; and
    automatically logging into the network or Internet site having the highest priority.

4. The method according to claim 1, further comprising:
    logging out of a logged-in network or Internet site by the mobile terminal if the determination result indicates the mobile terminal has moved a predetermined distance away from the automatic login geographical region.

5. The method according to claim 1, wherein the automatically logging into the network or Internet site comprising one of:
    automatically uploading content stored in the mobile terminal to the network or Internet site; and
    automatically updating mobile terminal information or corresponding user information previously provided to the network or Internet site.

6. The method according to claim 1, wherein the setting the automatic login geographical region includes:
    displaying a map; and
    selecting the automatic login geographical region via the map in response to a user selection command.

7. The method according to claim 1, further comprising:
    displaying a login history list including previous network or Internet sites that have been logged into and corresponding geographical regions of the previous logged into network or Internet sites; and
    turning on or off the automatic logging into the previous logged into network or Internet sites from a selectable icon displayed within the login history list.

8. A mobile terminal, comprising:
    a wireless communication unit configured to transmit and receive signals to and from a network or Internet site; and
    a controller operatively connected to the wireless communication unit and configured to:
        set an automatic login geographical region within the mobile terminal for automatically logging into the network or Internet site when the mobile terminal enters the automatic login geographical region,
        enter the mobile terminal into a standby mode;
        display a standby screen on a display unit of the mobile terminal during the standby mode,
        display a plurality of icon indicators on the standby screen corresponding to different network or Internet sites,
        determine whether or not the mobile terminal has entered or exited the automatic login geographical region and generate a corresponding determination result,
        automatically log into the network or Internet site if the determination result indicates that the mobile terminal has entered the automatic login geographical region, and
        update a corresponding icon indicator among the plurality of icon indicators to indicate that the corresponding network or Internet site has been automatically logged into.

9. The mobile terminal according to claim 8, wherein the plurality of icon indicators are displayed within a toolbar on the standby screen.

10. The mobile terminal according to claim 8, wherein the controller is further configured to:
    set different priorities for different network or Internet sites for the automatic login geographical region,
    determine which network or Internet site among the different network or Internet sites has a highest priority, and
    automatically log into the network or Internet site having the highest priority.

11. The mobile terminal according to claim 8, wherein the controller is further configured to log out of a logged-in network or Internet site if the determination result indicates the mobile terminal has moved a predetermined distance away from the automatic login geographical region.

12. The mobile terminal according to claim 8, wherein the controller is further configured to automatically upload content stored in the mobile terminal to the network or Internet site, or automatically update mobile terminal information or corresponding user information previously provided to the network or Internet site.

13. The mobile terminal according to claim 8, further comprising:
    said display unit operatively connected to the controller and configured to display a map, wherein the controller is further configured to select the automatic geographical login region via the map in response to a user selection command.

14. The mobile terminal according to claim 8, wherein the controller is further configured to:
- display a login history list including previous network or Internet sites that have been logged into and corresponding geographical regions of the previous logged into network or Internet sites, and
- turn on or off the automatic logging into the previous logged into network or Internet sites from a selectable icon displayed within the login history list.

* * * * *